2 Sheets—Sheet 1.

J. M. WHEELER.
MEASURING FAUCET.

No. 185,003. Patented Dec. 5, 1876.

Witnesses:
Clarence Poole
Rich. K. Evans.

Inventor:
John M. Wheeler
by his attys
A. H. Evans & Co.

UNITED STATES PATENT OFFICE

JOHN M. WHEELER, OF HILLSDALE, IOWA.

IMPROVEMENT IN MEASURING-FAUCETS.

Specification forming part of Letters Patent No. 185,003, dated December 5, 1876; application filed October 23, 1876.

*To all whom it may concern:*

Be it known that I, JOHN M. WHEELER, of Hillsdale, Iowa, have invented certain new and useful Improvements in Faucets for Measuring Liquids, of which the following is a full, clear, and exact description, reference being had to the accompanying drawings, making a part of this specification, in which—

Figure 1:
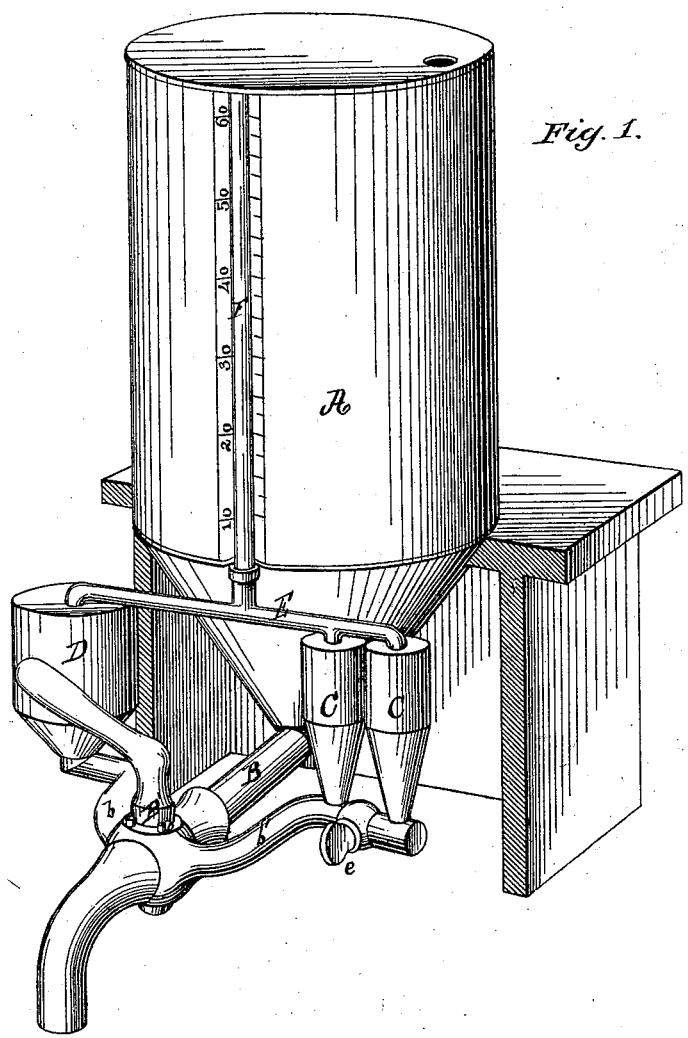
Figure 2:
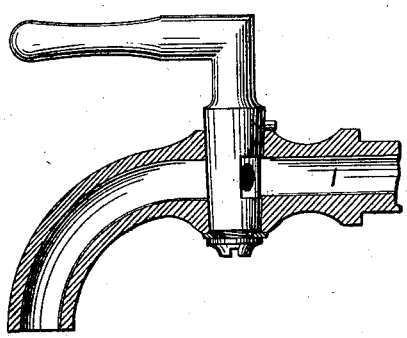
Figure 3:
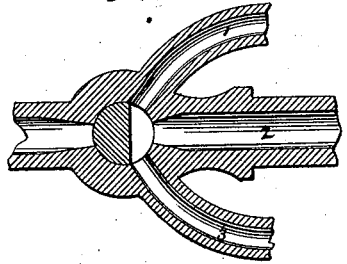
Figure 4:
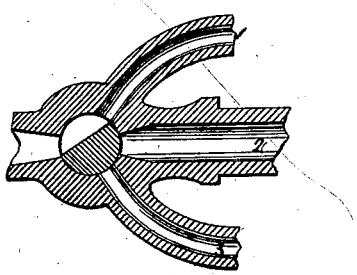
Figure 5:
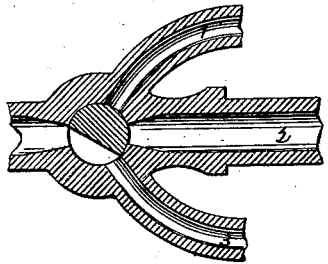

Figure 1 is a perspective view of my invention. Fig. 2 is a vertical section through the plug. Figs. 3, 4, and 5 are horizontal views of the faucet with the plug in different positions.

My invention relates to measuring and drawing off liquids from a vessel; and it consists in the combination of devices hereinafter described and claimed.

To enable others skilled in the art to make and use my invention, I will proceed to describe the exact manner in which I have carried it out.

In the drawings, A represents a tank or vessel containing the liquid to be measured and drawn off. Leading from the bottom of the vessel is the faucet B, provided with the two arms $b$ and $b'$, and with the plug B', formed as shown in Figs. 2 and 3, so as to control the liquid by opening or closing any one or all of the channels 1 2 3. On the arm $b'$ are secured two or more small closed measures, C C, of any desired capacity, with a stop-cock, $e$, to close the communication between them, as shown in Fig. 1. On the arm $b$ is secured a single closed measure, D, or more, of larger capacity and of any size desired. The three vessels C C D are connected by a vent-tube, E, which communicates near its center with the vertical tube F, extending to the top of the vessel A, and open at its upper end for the passage of air. This vertical tube I make of glass, and connect it with a graduated scale on the vessel, by which I am enabled at all times to determine the height of the liquid in the vessel.

The tube, for greater safety, may be partially embodied in a crease or groove formed in the side of the vessel, as shown in Fig. 1.

From the above description it is evident that either or all three of the measures C C D may be filled and emptied at pleasure. If it be desired to fill only one of the small measures, the stop-cock $e$ is closed; or, by opening it, both measures may be filled, and by closing it after filling one measure may be emptied without disturbing the other.

Having thus described my invention, what I claim as new, and desire to secure by Letters Patent, is—

The faucet B, provided with the arms $b$ $b'$, and plug B', in combination with the measures C C D, provided with the ventilating-tubes E and F, substantially as and for the purpose set forth.

JOHN M. WHEELER.

Witnesses:
N. B. STRONG,
E. G. DRURY.